United States Patent
Rhee et al.

(10) Patent No.: US 6,442,315 B1
(45) Date of Patent: Aug. 27, 2002

(54) OPTICAL WAVEGUIDE CHIP AND METHOD OF FORMATION THEREOF

(75) Inventors: Tae-hyung Rhee, Sungnam; Hyung-jae Lee; Sang-yun Yi, both of Yongin; Byong-gwon You, Daejeon, all of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/195,660

(22) Filed: Nov. 18, 1998

(30) Foreign Application Priority Data

Nov. 18, 1997 (KR) .............................. 97-60813

(51) Int. Cl.[7] .............................................. G02B 6/26
(52) U.S. Cl. .......................................... 385/43; 385/50
(58) Field of Search ......................... 385/50, 39, 31, 385/43

(56) References Cited

U.S. PATENT DOCUMENTS

| | | | |
|---|---|---|---|
| 4,666,236 A | | 5/1987 | Mikami et al. |
| 4,776,661 A | | 10/1988 | Handa |
| 5,687,272 A | * | 11/1997 | Vinchant et al. ............ 385/131 |
| 5,854,868 A | * | 12/1998 | Yoshimura et al. ............ 385/50 |
| 6,028,973 A | * | 2/2000 | Schienle et al. ............... 385/32 |
| 6,160,927 A | * | 12/2000 | Leclerc et al. ................. 385/14 |

FOREIGN PATENT DOCUMENTS

| | | |
|---|---|---|
| EP | 0 302 043 A2 | 2/1989 |
| EP | 0 569 181 A1 | 11/1993 |
| EP | 0 651268 A1 | 5/1995 |
| EP | 0 811 860 A2 | 12/1997 |
| JP | 57-135906 | 8/1982 |
| JP | 63-163407 | 7/1988 |
| JP | 64-49004 A | 2/1989 |
| JP | 2-93605 A | 4/1990 |
| JP | 4-34505 | 2/1992 |
| JP | 4-220609 A | 8/1992 |
| JP | 7-84146 | 3/1995 |
| JP | 7-128544 | 5/1995 |
| JP | 7-191226 | 7/1995 |
| JP | 9-297235 | 11/1997 |
| WO | WO 95/14947 | 6/1995 |

OTHER PUBLICATIONS

"Single–mode optical fiber" obtained from the Web site http://www.its.dldrdoc.gov/fs–1037/dir–033/_4910.htm.

Mitomi et al., "Design of a Single–Mode Tapered Waveguide for Low–Loss Chip–to–Fiber Coupling", *IEEE Journal of Quantum Electronics*, vol. 30 (8), 1994, pp. 1787–1793.

A.R. Nelson, "Coupling Optical Waveguides by Tapers", *Applied Optics*, vol. 14 (12), 1975, pp. 3012–3015.

* cited by examiner

*Primary Examiner*—Frank G. Font
*Assistant Examiner*—Andrew H. Lee
(74) *Attorney, Agent, or Firm*—Robert E. Bushnell, Esq.

(57) ABSTRACT

An optical waveguide chip includes an output waveguide connected to an optical fiber, an optical fiber array module, or another optical waveguide chip. The output waveguide has a coupling cross-section wider than the core of the optical fiber, the core of an optical fiber of the optical fiber array module, and the waveguide of the other optical waveguide, respectively. The cross-section width of the output waveguide of the optical waveguide chip gradually increases toward an end of the waveguide with a slant angle of 10° or less. Therefore, when the optical waveguide chip is connected to the optical fiber, the optical fiber array module, or the other optical waveguide chip during packaging of an optical waveguide device, an offset of the optical axis of about ±20% of the width of the waveguide guide is allowable. As a result, there are no additional or extra steps in fabrication of an optical waveguide chip and no additional loss of the optical characteristics, and the required interconnection or production time is considerably reduced.

14 Claims, 5 Drawing Sheets

300  310  320  330  340  350

OPTICAL WAVEGUIDE CHIP AND METHOD OF FORMATION THEREOF

CLAIM OF PRIORITY

This application makes reference to, incorporates the same herein, and claims all benefits accruing under 35 U.S.C. §119 from an application for OPTICAL WAVEGUIDE CHIP earlier filed in the Korean Industrial Property Office on the Nov. 18, 1997 and there duly assigned Serial No. 60813/1997.

BACKGROUND OF THE INVENTION

1. Field of the Invention

The present invention relates to an optical device and method of formation thereof and, more particularly, to an optical waveguide chip capable of increasing an allowable error range relative to precise coupling. In accordance with the invention, optical connection loss is barely affected when an optical waveguide chip is connected to an optical fiber, an optical fiber array module or another optical waveguide chip for packaging of an optical waveguide device.

2. Related Art

In planar waveguide technology for an optical waveguide device, one goal is to fabricate lowcost parts for optical communication through mass production. In general, the fabrication process for an optical waveguide chip has developed such that the optical waveguide chip can be mass produced based on semiconductor fabrication technology. However, compared to fabrication technology, packaging technology for an optical waveguide device has been slow to develop. Such slow development rate of the packaging technology has been the biggest hindrance to mass production. In particular, the technology of coupling an optical waveguide chip to an optical fiber, an optical fiber array module or another optical waveguide chip is very important in passive elements as a factor influencing the characteristics and cost of a device. This technology is vital for low-cost mass production, as well as for securing the optical characteristics of an optical waveguide device.

As explained in more detail below, interconnection methods for coupling an optical waveguide chip to another optical waveguide chip, an optical fiber array module or an optical fiber have the disadvantage of being required to meet stringent precision requirements in the interconnection in order to avoid excessive coupling loss. Therefore, highly skilled personnel and exorbitant time are required, with consequent increases in difficulty and cost of manufacturing or mass production.

SUMMARY OF THE INVENTION

To solve the above problems, it is an object of the present invention to provide an optical waveguide chip and method of formation thereof, wherein the optical waveguide chip is capable of increasing an allowable error range relative to precise coupling without an increase in optical connection loss when the optical waveguide chip is connected to an optical fiber, an optical fiber array module or another optical waveguide chip for packaging of an optical waveguide device.

Accordingly, to achieve the above object, there is provided an optical waveguide chip comprising an output waveguide connected to an optical fiber, an optical fiber array module or another optical waveguide chip, wherein the output waveguide has a coupling cross-section wider than the core of the optical fiber (in the first case), wider than the core of the optical fiber of the optical fiber array module (in the second case), and wider than the core of the waveguide of the other optical waveguide (in the third case).

Preferably, the cross-section width of the output waveguide of the optical waveguide chip gradually increases toward the end of the waveguide, with a slant angle of 10° or less.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1A:
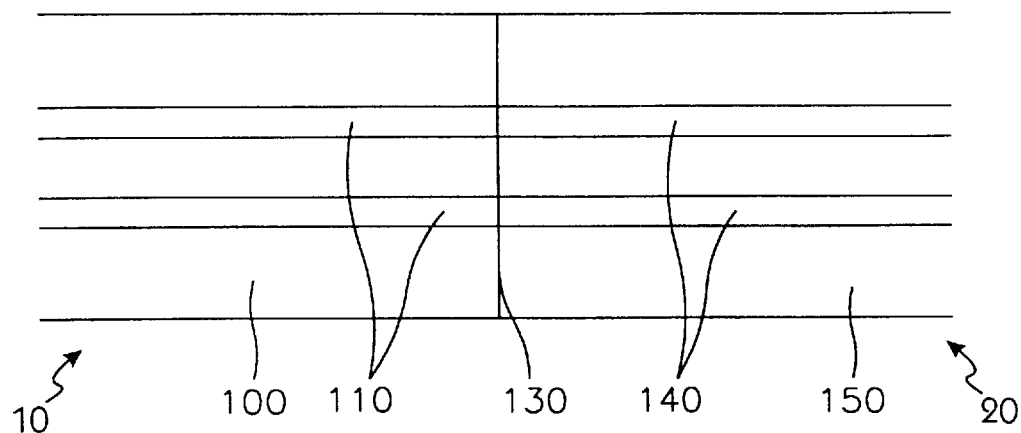
FIG. 1A shows the interconnection between an output waveguide of an optical waveguide chip and an input waveguide of another optical waveguide chip.

FIG. 1A shows the coupling between an output waveguide of an optical waveguide chip and an input waveguide of another optical waveguide chip. In FIG. 1A, reference numeral 100 represents a substrate of an optical waveguide chip 10 having an output waveguide, reference numeral 110 represents the output waveguide of the optical waveguide chip 10, reference numeral 130 represents the interconnection interface between the optical waveguide chip 10 having the output waveguide 110 and another optical waveguide chip 20 having an input waveguide, reference numeral 140 represents the input waveguide of the optical waveguide chip 20, and reference numeral 150 represents a substrate of the optical waveguide chip 20 having the input waveguide 140.

Figure 1B:
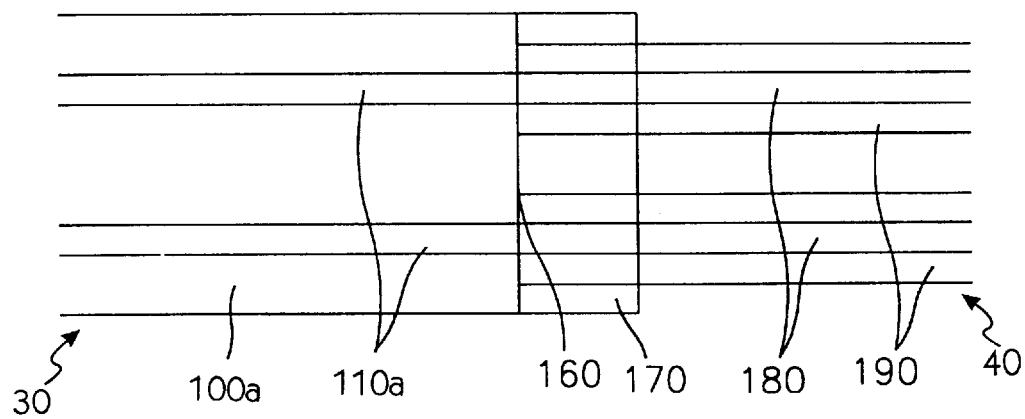
FIG. 1B shows the interconnection between the output waveguide of the optical waveguide chip and an optical fiber array module.

FIG. 1B shows the interconnection between an output waveguide of an optical waveguide chip and an optical fiber array module. In FIG. 1B, reference numeral 160 represents an interconnection interface between the optical waveguide chip 30 having the output waveguide 110a and the optical fiber array module 40, reference numeral 170 represents an alignment substrate of the optical fiber array module 40, reference numeral 180 represents the core of an optical fiber in module 40, and reference numeral 190 represents the optical fiber.

Figure 1C:
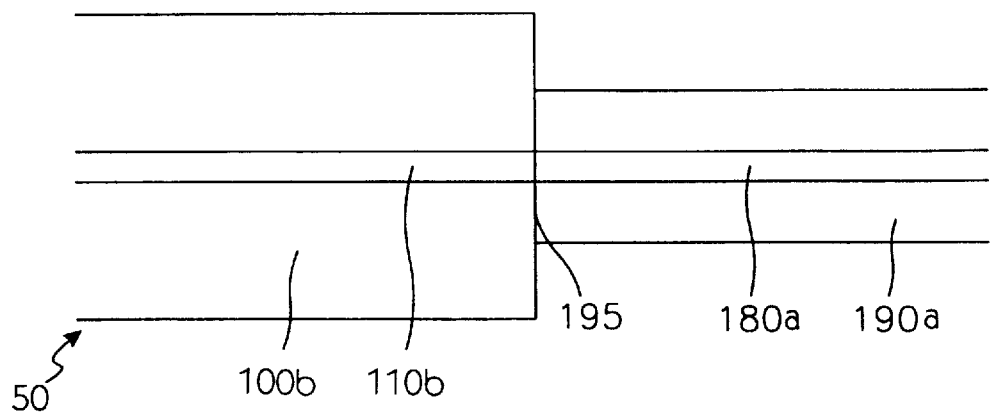
FIG. 1C shows the interconnection between the output waveguide of the optical waveguide chip and an optical fiber.

FIG. 1C shows the interconnection between the output waveguide of an optical waveguide chip and an optical fiber. In FIG. 1C, reference numeral 195 represents an interconnection interface between the optical waveguide chip 50 having a substrate 100b and an output waveguide 110b and the optical fiber 190a having core 180a.

As shown in FIGS. 1A thru 1C, when an optical waveguide chip is connected to an optical fiber, an optical fiber array module or another optical waveguide chip, the allowable error range in precision of interconnection must be maintained below the order of a submicron, which is less than 1 μm and corresponds to approximately 10% of the width of a single mode waveguide. This is necessary in order to minimize optical coupling loss. In order to secure such precision, expensive precision aligning equipment, highly-skilled personnel and much time are required, thereby increasing the manufacturing cost and making mass production difficult.

Figure 2A:
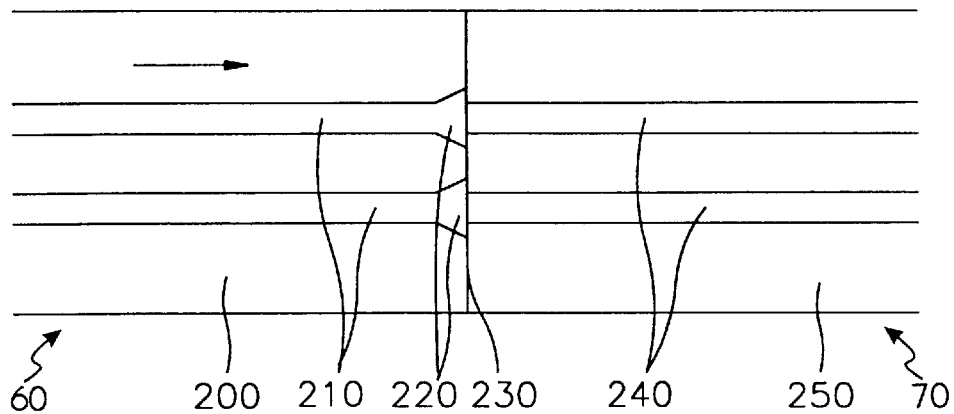
FIG. 2A shows the interconnection between an output waveguide of an optical waveguide chip and an input waveguide of another optical waveguide chip, according to a preferred embodiment of the present invention.

In FIG. 2A, the interconnection between an output waveguide chip and an input waveguide of another optical waveguide chip according to a preferred embodiment is shown. Here, reference numeral 200 represents a substrate of the optical waveguide chip 60, reference numeral 210 represents an output waveguide of the optical chip 60, reference numeral 220 represents an increasing-width region of the output waveguide 210, reference numeral 230 represents an interconnection interface between the output waveguide 210 of the optical waveguide chip 60 and the input waveguide 240 of another optical waveguide chip 70, reference numeral 240 represents the input waveguide of the other optical waveguide chop 70, and reference numeral 250 represents a substrate of the other optical waveguide chip 70.

Figure 2B:
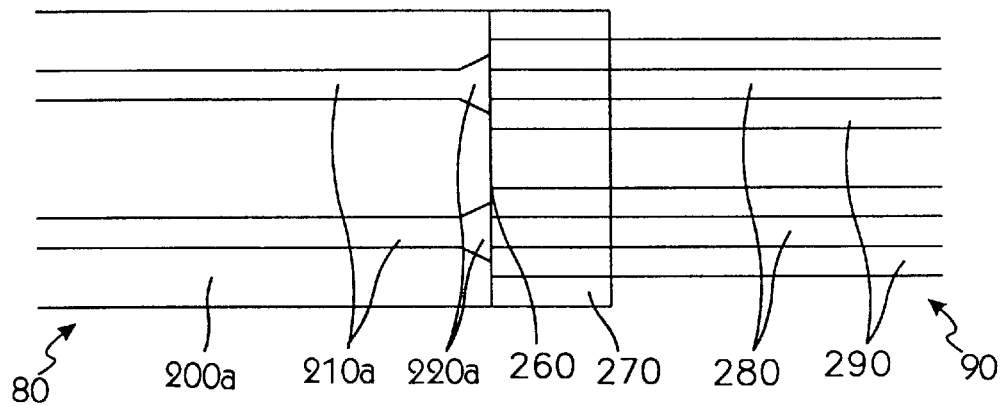
FIG. 2B shows the interconnection between the output waveguide of the optical waveguide chip and an optical fiber array module, according to another preferred embodiment of the present invention.

FIG. 2B shows the interconnection between the output waveguide of an optical waveguide chip and an optical fiber array module according to another embodiment of the present invention. In FIG. 2B, reference numeral 260 represents an interconnection interface between the output waveguide 210a of the optical waveguide chip 80 and the optical fiber array module 90, reference numeral 270 represents an alignment substrate of the optical fiber array module 90, reference numeral 280 represents the core of an optical fiber 290 of module 90, and reference numeral 290 represents the optical fiber.

Figure 2C:
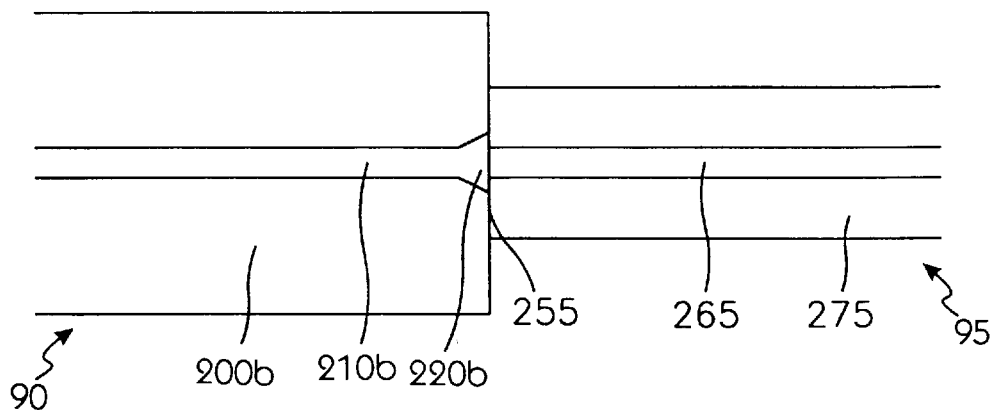
FIG. 2C shows the interconnection between the output waveguide of the optical waveguide chip and an optical fiber, according to still another preferred embodiment of the present invention.

FIG. 2C shows the interconnection between the output waveguide of an optical waveguide chip and an optical fiber. In FIG. 2C, reference numeral 255 represents an interconnection interface between the output waveguide 210b of the optical waveguide chip 90 and an optical fiber 45, reference numeral 265 represents the core of the optical fiber 95, and reference numeral 275 represents the clad of the optical fiber 95.

As shown in FIGS. 2A thru 2C, the output waveguide 210, 210a or 210b of the optical waveguide chip 60, 80 or 90 has an increasing-width region 220, 220a or 220b with a cross-section wider than the cross-section of the other optical waveguide 240, or the cross-section of the optical fiber 280 of the optical fiber array module 90, or the cross-section of the core 265 of the optical fiber 95, respectively.

The cross-section of the output waveguide 210, 210a or 210b of the optical waveguide chip 60, 80 or 90 gradually increases toward the end of the waveguide, with a slant angle of 10° or less. The end width of the output waveguide 210, 210a or 210b of the optical waveguide chip 60, 80 or 90 is optimally two to four times the maximum width of a single mode waveguide. Preferably, the point where the width of the output waveguide 210, 210a or 210b of the optical waveguide chip 60, 80 or 90 begins to increase is separated from the end of the waveguide of the optical waveguide chip 60, 80 or 90 by 6–12 times the maximum width of a single mode waveguide.

The substrate 200, 200a or 200b of the optical waveguide chip 60, 80 or 90 may be formed of $LiNbO_3$, silicon wafer, $Si_3N_4$, inorganic glass, or a semiconductor from Group III–V of the Periodic Table. The output waveguide 210, 210a or 210b is obtained by depositing a diffusion material of increasing index of refraction on a planar substrate having light transmission in a used optical wavelength, and then diffusing and permeating the diffusion material into the planar substrate by using a chemical or mechanical method.

The optical waveguide chip 60, 80 or 90 of the present invention will now be described. The structure of the output waveguide 210, 210a or 210b of the optical waveguide chip 60, 80 or 90 is such that the width of the waveguide gradually increases from a point displaced from the end of the waveguide by a distance about 10 times the width of the waveguide. Thus, the end width of the waveguide is approximately 2 times the normal width of the waveguide, resulting in the output waveguide having a rectangular cross-section. As a result, when the output waveguide 210, 210a or 210b of the optical waveguide chip 60, 80 or 90 is connected to an optical fiber 95, an optical fiber array module 90 or an input waveguide 240 of another optical waveguide chip 70, the coupling loss can be minimized, even if the optical axis is offset by ±20%.

Figure 3A:
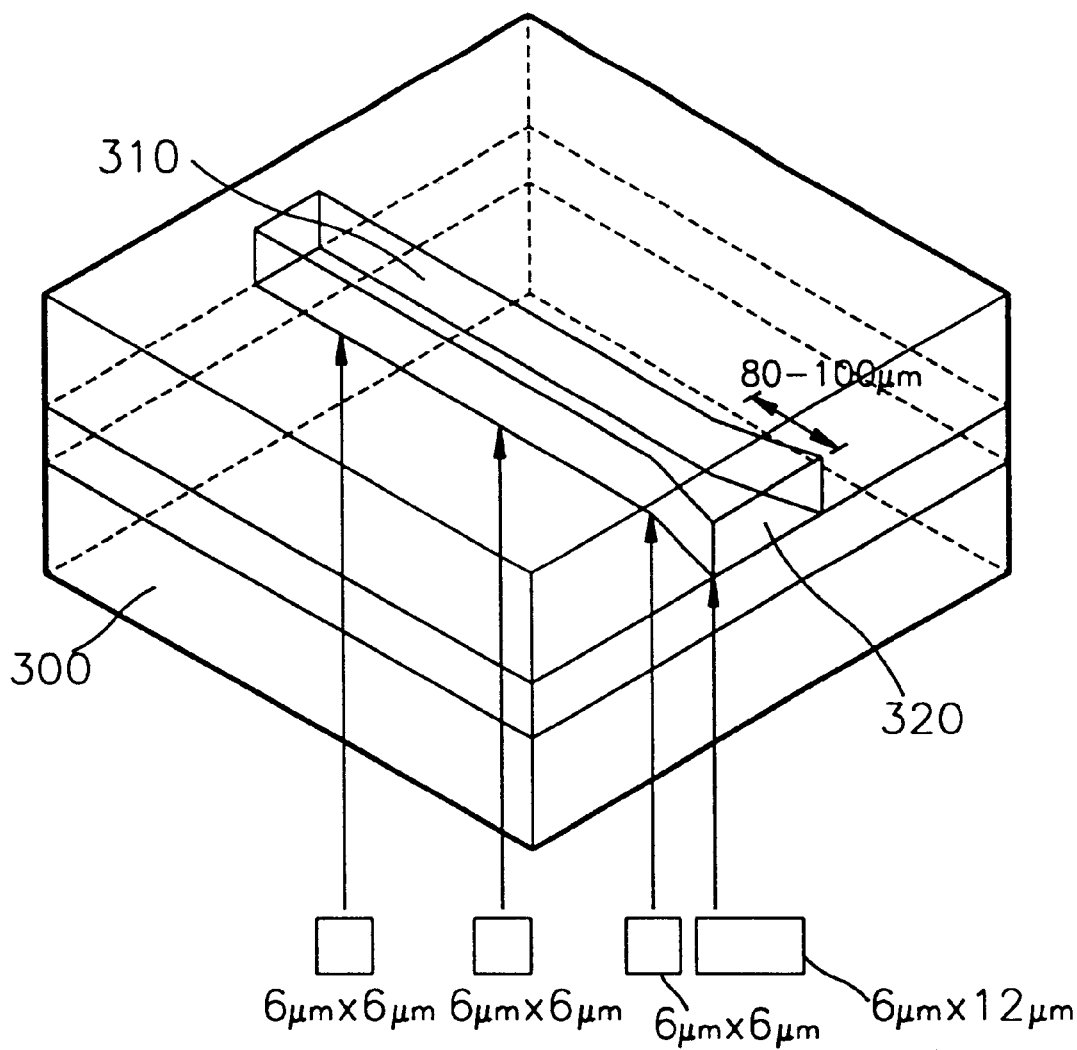
FIG. 3A shows an example of the structure of an optical waveguide chip having a 6 μm-square optical waveguide under a single mode condition.

FIG. 3A shows an example of the structure of an optical waveguide chip having a 6 μm-square optical waveguide under a single mode condition. In FIG. 3A, reference numeral 300 represents a substrate of the optical waveguide chip, reference numeral 310 represents an output waveguide of the optical waveguide chip, and reference numeral 320 represents an increasing-width region of the output waveguide 310. According to the example of FIG. 3A, the width of a 6 μm×6 μm waveguide of the optical waveguide chip gradually increases from a point approximately 60~100 μm from the end of the optical waveguide chip at a predetermined angle, such that the end width of the output waveguide is approximately 12 μm. In this case, the transmission characteristic is 90% or more even when the center is offset by as much as ±1.5 μm.

Figure 3B:
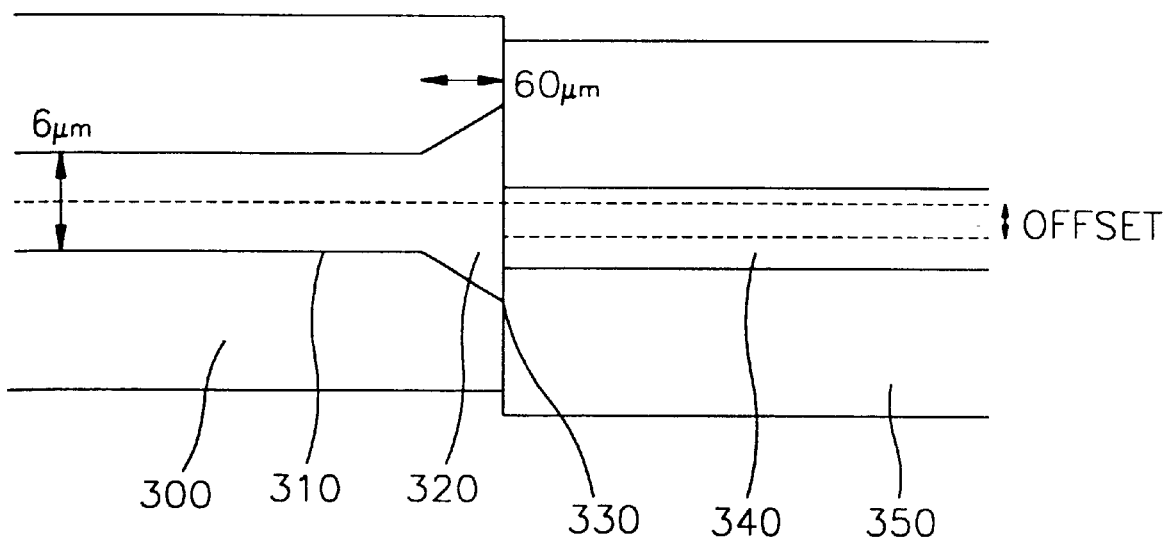
FIG. 3B shows the transmission characteristics according to the waveguide structure and offset when two optical waveguide chips are connected.

FIG. 3B shows the transmission characteristics for the waveguide structure and offset when two optical waveguide chips are connected. In FIG. 3B, reference numeral 330 represents an interconnection interface between the output waveguide 310 of an optical waveguide chip and the input waveguide 340 of another optical waveguide chip, reference numeral 340 represents the input waveguide of the other optical waveguide chip, and reference numeral 350 represents a substrate of the other optical waveguide chip.

Figure 3C:
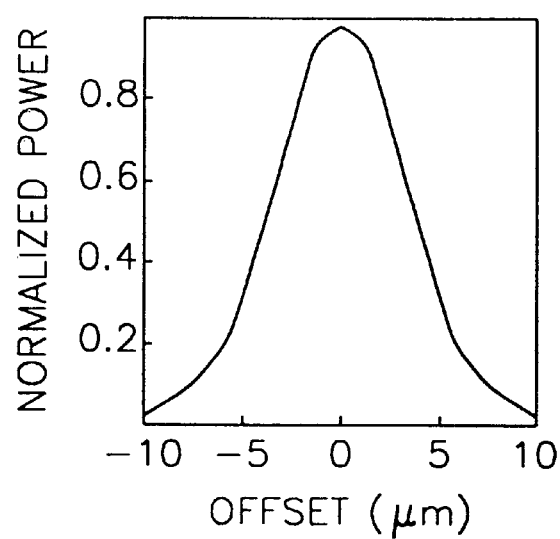
FIG. 3C shows the light transmission characteristics according to the offset of the optical waveguide chip shown in FIG. 3B.

FIG. 3C shows the light transmission characteristics for the offset of the optical waveguide chip shown in FIG. 3B. Referring to FIGS. 3A–3C, when the length of the increasing-width region 320 of the waveguide 310 increases 10 or more times the width of a single mode waveguide, the transmission characteristic of the waveguide decreases slightly.

Figure 3D:
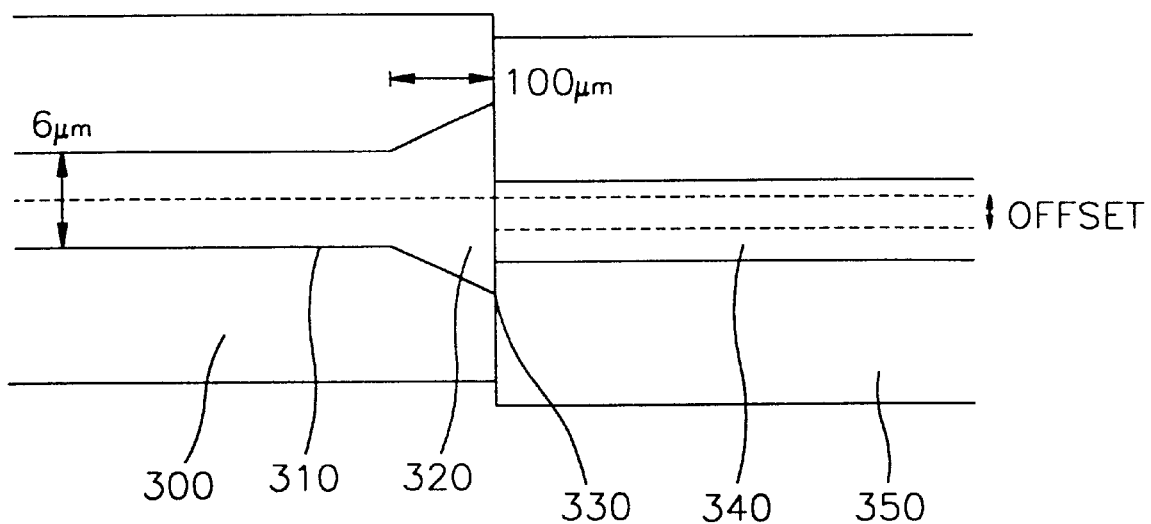
FIG. 3D shows the transmission characteristics according to the waveguide structure and offset when two optical waveguide chips are connected, wherein the length of an increasing-width region has increased.
Figure 3E:
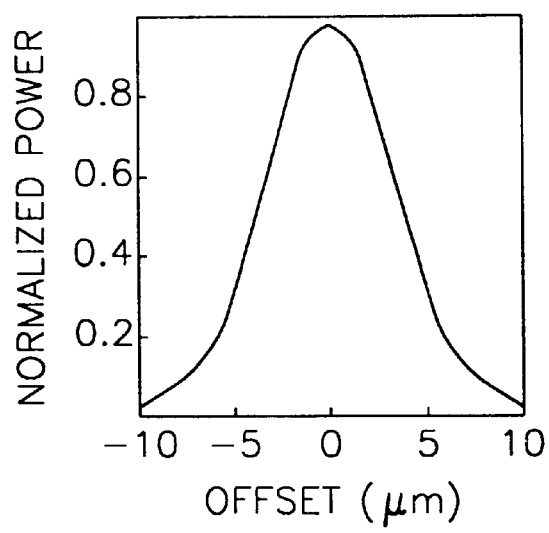
FIG. 3E shows the light transmission characteristics according to the offset of the optical waveguide chip shown in FIG. 3D.

FIG. 3D shows the transmission characteristics for the waveguide structure and offset when two optical waveguide chips are connected, wherein the length of the increasing-width region 320 has increased, and FIG. 3E shows the light transmission characteristics for the offset of the optical waveguide chip shown in FIG. 3D. However, if the width of the end of the output waveguide 310 sharply increases with a slant angle of approximately 5° or more, a great amount of coupling loss occurs.

As described above, when an optical waveguide chip is connected to an optical fiber, an optical fiber array module or another optical waveguide chip during packaging of an optical waveguide device, an offset of the optical axis of ±20% is allowable. Also, there are no additional steps and additional loss of optical characteristics, compared to prior fabrication methods, and the required coupling time can be considerably reduced. In particular, whereas the coupling loss is very sensitive to the offset of the optical axis when an optical waveguide chip is connected to an optical fiber array module or another optical waveguide chip, the coupling loss can be considerably compensated for by implementation of the present invention.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An optical waveguide chip comprising an output waveguide connected to one of an optical fiber, an optical fiber array module, and another optical waveguide chip, wherein the output waveguide has a coupling cross-section wider than one of a core of the optical fiber, a core of an optical fiber of the optical fiber array module, and a cross-section of a waveguide of said another optical waveguide, respectively; and wherein the output waveguide of the optical waveguide chip has a variable cross-sectional width which gradually increases from a first value at a certain point to a second larger value at an end of the output waveguide of the optical waveguide chip, said certain point being displaced from the end of the output waveguide of the optical waveguide chip by a distance substantially equal to 6 to 12 times a width of a corresponding single-mode output waveguide.

2. The optical waveguide chip of claim 1, wherein the cross-sectional width of the output waveguide increases with a slant angle of no greater than 10°.

3. The optical waveguide chip of claim 1, wherein the optical waveguide chip includes a substrate formed of a material selected from the group consisting of $LiNbO_3$, silicon wafer, $Si_3N_4$, inorganic glass, and a semiconductor from Group III-V of the Periodic Table.

4. The optical waveguide chip of claim 1, wherein the output waveguide is made by depositing a diffusion material having an increasing index of refraction on a planar substrate having a light transmission in a used optical wavelength, and then diffusing and permeating the diffusion material into the planar substrate by using one of a chemical method and a physical method.

5. The optical waveguide chip of claim 1, wherein an end width of the output waveguide of the optical waveguide chip is up to 4 times a width of a corresponding signal-mode output waveguide.

6. An optical waveguide chip comprising an output waveguide connected to an optical device having an input portion, wherein the output waveguide has a coupling cross-section wider than a coupling cross-section of the input portion of the optical device; and wherein the output waveguide of the optical waveguide chip has a variable cross-sectional width which gradually increases from a first value at a certain point to a second larger value at an end of the output waveguide of the optical waveguide chip, said certain point being displaced from the end of the output waveguide of the optical waveguide chip by a distantially equal to 6 to 12 times a width of a corresponding single-mode output waveguide.

7. The optical waveguide chip of claim 6, wherein the optical device comprises another optical waveguide chip and the input portion comprises an input waveguide having a cross-section narrower than the coupling cross-section of the output waveguide.

8. The optical waveguide chip of claim 6, wherein the optical device comprises an optical fiber and the input portion comprises a core of the optical fiber.

9. The optical waveguide chip of claim 6, wherein the optical device comprises an optical fiber array module and the input portion comprises at least one optical fiber of the optical fiber array module.

10. The optical waveguide chip of claim 6, wherein the cross-sectional width of the output waveguide increases with a slant angle of no greater than 10°.

11. The optical waveguide chip of claim 6, wherein an end width of the output waveguide of the optical waveguide chip is up to 4 times a width of a corresponding single-mode output waveguide.

12. The optical waveguide chip of claim 6, wherein the optical waveguide chip includes a substrate formed of a material selected from the group consisting of $LiNbO_3$, silicon wafer, $Si_3N_4$, inorganic glass, and a semiconductor from Group III-V of the Periodic Table.

13. The optical waveguide chip of claim 6, wherein the output waveguide is made by depositing a diffusion material having an increasing index of refraction on a planar substrate having a light transmission in a used optical wavelength, and then diffusing and permeating the diffusion material into the planar substrate by using one of a chemical method and a physical method.

14. An optical waveguide chip comprising an output waveguide connected to one of an optical fiber, an optical fiber array module, and another optical waveguide chip, wherein the output waveguide has a coupling cross-section wider than one of a core of the optical fiber, a core of an optical fiber of the optical fiber array module, and a cross-section of a waveguide of said another optical waveguide, respectively;

wherein the optical waveguide chip includes a substrate formed of a material selected from the group consisting of $LiNbO_3$, inorganic glass, and a semiconductor from Group III-V of the Periodic Table.

* * * * *